Dec. 16, 1930.　　　　　S. SCHIFF　　　　　1,785,562

DIFFERENTIAL SPEED AGITATOR DRIVE

Filed Dec. 8, 1927　　　3 Sheets-Sheet 1

Inventor

Sigmund Schiff,

By Murray Guyelta

Attorneys

Dec. 16, 1930.  S. SCHIFF  1,785,562
DIFFERENTIAL SPEED AGITATOR DRIVE
Filed Dec. 8, 1927  3 Sheets-Sheet 3

Inventor
Sigmund Schiff
By Murray and Zugelter
Attorneys.

UNITED STATES PATENT OFFICE

SIGMUND SCHIFF, OF CINCINNATI, OHIO, ASSIGNOR TO THE J. H. DAY COMPANY, OF CINCINNATI, OHIO, A CORPORATION OF OHIO

DIFFERENTIAL-SPEED AGITATOR DRIVE

Application filed December 8, 1927. Serial No. 238,643.

This invention relates to a power transmission and change speed mechanism and has for an object the provision of such mechanism wherein power from a continuous speed medium may be transmitted through several gear trains to attain several speeds.

The present invention more specifically relates to a differential speed transmission for use in cake mixers and provides certain improvements on the kindred device shown in my application for patent Serial No. 210,408 filed August 3, 1927.

Another object is to provide a cake mixer wherein the beater element may be moved through a circumference and at the same time rotated on its axis at any one of a number of predetermined speeds.

These and other objects are attained by the means described herein and disclosed in the accompanying drawings, in which.

Figure 1:
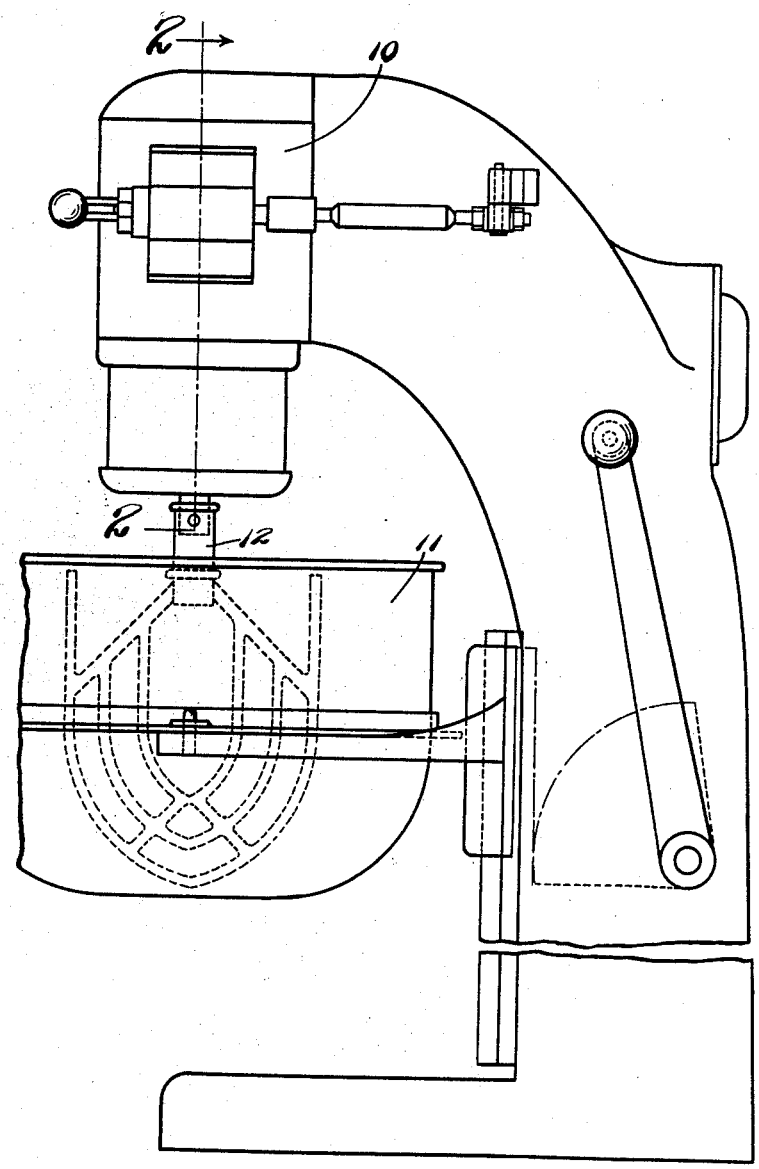
Fig. 1 represents a cake mixing apparatus having embodied therein a device of the invention.

In the herein disclosed embodiment the cake mixer is provided with the usual head 10 disposed over the mixing bowl 11 in which the agitator or beater 12 is disposed. The agitator in this embodiment rotates about its axis and also moves through a circumference in the bowl thereby attaining a more efficient mixing of the contents of the bowl.

A sprocket 13 supplies the continuously operating power through a suitable chain and rotates a clutch member 14 mounted on a sleeve 15 with the sprocket 13. The power shaft 16 carries a complementary clutch member 17 which is operable through a clutch lever 18 for rotating bevel gear 19 which meshes with bevel gear 20 keyed to the main drive shaft 21. Drive shaft 21 has suitable bearings 22 and 23 mounted in webs or plates 24 and 25 which are secured in or made integral with the stationary housing 26. A counter-shaft 27 is likewise journaled in said webs or plates 24 and 25. Gears 28 and 29 are keyed to the drive shaft 21 and are adapted to mesh with gears 30 and 31 respectively which are splined upon the counter-shaft 27. Suitable means hereinafter described are provided for shifting the slidable gear unit 30—31 to obtain engagement between gears 28 and 30 or between gears 29 and 31. From the foregoing it will be apparent that the gear unit 30—31 may be placed in an intermediate position wherein the counter-shaft 27 receives no power from the drive shaft 21, or the gears may be shifted for attaining different speeds determined by the gear ratio.

Freely revoluble upon the drive shaft 21 is an internal ring gear assembly indicated generally as 32 and provided with an upper internal ring gear 33 and a lower internal ring gear 34 which operates as a unit. The lower end of counter-shaft 27 carries a pinion 35 which is in constant mesh with the upper ring gear 33. From the foregoing it will be apparent that rotation may be imparted to the ring gear structure 32 from the drive shaft when the gears 28 and 30 or gears 29 and 31 are meshed so that the ring gear 32 may be rotated upon rotation of the drive shaft 21. A disc 36 which is provided with an extended hub portion 37 is also mounted for free rotation upon the lower end of shaft 21. The disc 36 carries a freely rotatable pinion 38 which meshes with the lower ring gear 34 and also with a pinion 39 which is keyed upon drive shaft 21. It will be apparent that when the gear 35 rotates to drive the ring gear structure 32 in one direction at the same rate as the drive shaft 21 rotates pinion 39 in the opposite direction, or in other words a one to one ratio, the pinion 38 will merely serve as an idler gear which rotates on disc 36. When the gears 30—31 are not engaged upon gears 28 or 29, the drive is through pinions 39, 38 and ring gear 34, but at this time the pinion 35 and shaft 27 are held fast against rotation by means of a tooth 40 which may be integral with the casing and which meshes with the gear 31. Therefore the ring gear is held stationary and the disc 36 is driven at a speed determined by the ratio between pinion 39 and the ring gear 34. From the foregoing it will be apparent that a multiplicity of speeds may be had by providing various gear ratios between the shafts 21 and 27 and that if the ratio of drive between gear 35 and ring gear 33 be sufficiently high in proportion to the ratio between pinions 39 and gear 34, the result will be a reverse rotation of the disc 36. A shaft 41 is suitably journaled in hub portion 37 of the disc 36 and has a pinion 42 keyed thereon in mesh with a stationary or fixed ring gear 420. This shaft 41 carries the agitator 12 in the device shown in Fig. 1 and is moved through a circumference by the disc 36 and is rotated by reason of its geared engagement with the ring gear 420. Thus it will be noted that the gear ratio between pinion 42 on the agitator and the stationary ring gear 420 is always constant so that the speed with which the agitator shaft 41 rotates will always be proportionate to the speed of rotation of the hub 37 which carries said shaft 41 through a circumference in the mixing bowl.

Figure 2:
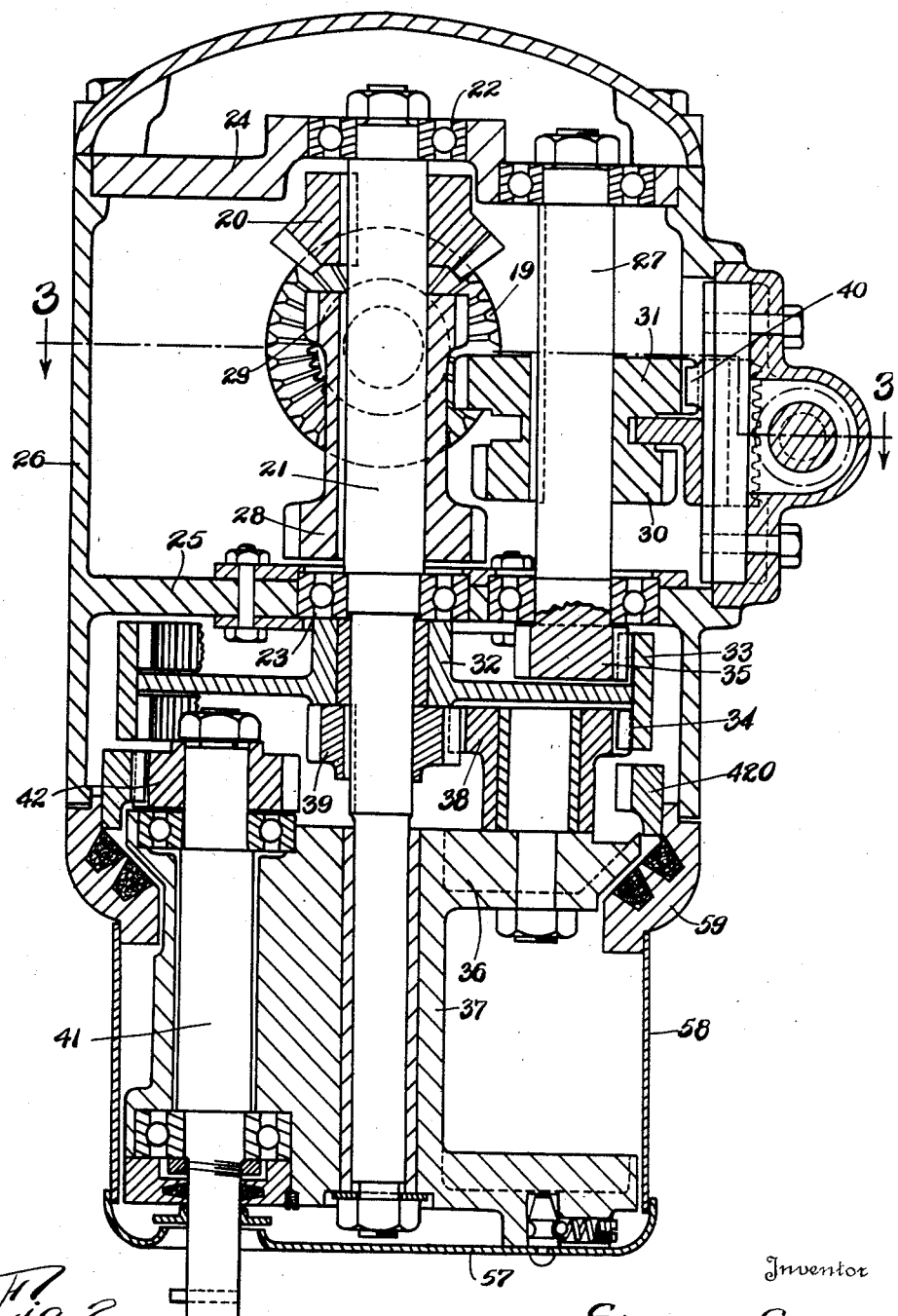
Fig. 2 is a view taken on line 2—2 of Fig. 1 showing a longitudinal section of the device.

The operating device for shifting gears comprises a shaft 43 which may be oscillated and reciprocated in a suitable bearing 44 on the inside of housing 26. Shaft 43 carries a pinion 45 with which is engaged a slidable rack 46 having a yoke 47 embracing the body of slidable gear member 30—31. It will be noted that oscillation of the shaft 43 effects reciprocation of the rack 46 and consequently a reciprocation of the gear unit 30—31 upon counter-shaft 27 to effect engagement with gears 28 or 29. When the rack 46 is intermediate its limits of reciprocation the gears 30—31 are out of engagement with those on shaft 21 but the gear 31 is locked by its engagement with the stationary tooth 40. The end of shaft 43 is slotted at 48 and a lever 49 is pivotally mounted in said slot for turning the shaft. One end of the lever 49 is pivotally mounted on an arm 50 carried by a rotatable ring 51 on the bearing 44. A stationary collar 52 precludes reciprocation of ring 51 and carries on its exposed face slots 53 disposed at angles to one another in which slots the lever 49 may seat to preclude accidental rotation of shaft 43. The opposite end of the shaft 43 carries a socket 54 which contains a swivel ball end 55 of a link 56 which has pivotal connection with the free outer end of clutch lever 18. From the foregoing description it will be apparent that when the lever 49 is pulled out of a slot 53 in order to permit rotation of the shaft, said shaft 43 will move longitudinally, pulling the free end of the clutch lever with it and thereby disengaging the clutch 14—17 and thus breaking the power connection to the drive shaft 21. The shaft 43 may then be rotated by turning the lever 49 so that the gear unit 30—31 may be moved to the several positions, for example as shown in Fig. 2 with the gear 31 locked on tooth 40, or it may be moved to engage gears 29 and 31, or gears 28 and 30. It will be noted that the gear shift mechanism is selective. When the gears have been shifted to the desired position the operation of seating the lever into the selected notch 53 simultaneously locks the shaft 43 against further rotation and again engages the clutch members 14—17. As shown in Fig. 2 a protective drip pan 57 is secured for rotation with the disc 36, hub 37 and associated parts. A tubular stationary drum 58 is secured to the lower end 59 of housing 26 to protect the parts against dust and to prevent escape of lubricant into the mixing bowl.

It will be understood that in constructing a mechanism of the invention for a cake mixer as described thus far, the gear ratios between the several gears, pinions and ring gears may be so selected as to exclude reverse rotation if desired.

Figures 3, 4:
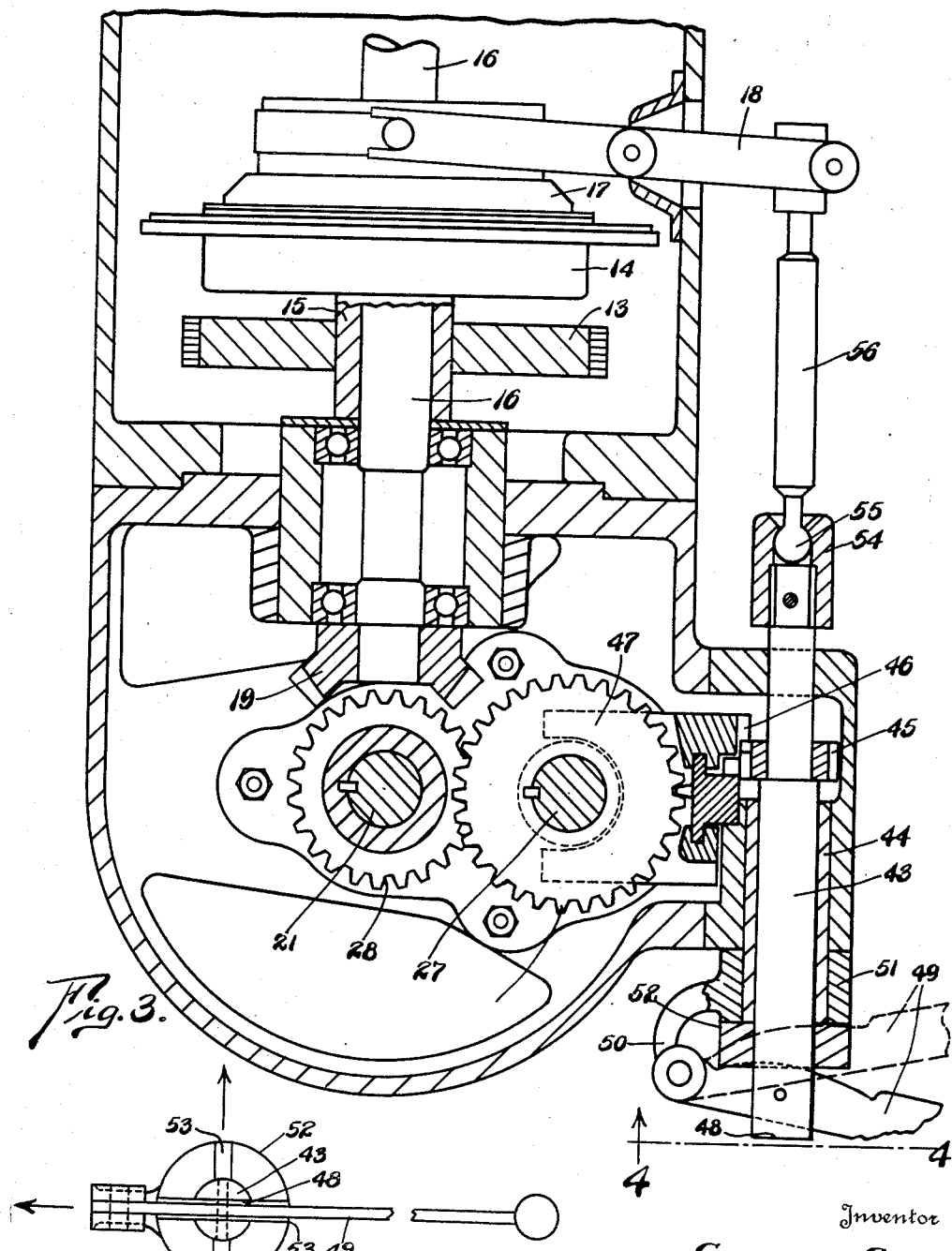
Fig. 3 is a view taken on line 3—3 of Fig. 2.
Fig. 4 is a view taken on line 4—4 of Fig. 3.

The operation of the device will be readily understood. Whenever the operating lever 49 is pulled out of the slot in the device shown in Figs. 1, 2 and 3 no power is transmitted to the shaft 21. At this time the lever may be turned to move the rack for positioning gears 30 and 31, or in other words selecting the speed desired. The several speeds are attained in the manner set forth concurrently with the description of the parts and will not require repetition. Briefly stated when the ring gear 32 is held stationary it serves as a rack over which pinion 38 travels under the power from pinion 39 for imparting rotation to the disc 36. When the ring gear is power driven through gear 35 its tendency is to move the pinion 38 in the same direction as does pinion 39. The resultant rotation of disc 36 is therefore slower. If the speed of the ring gear is increased so that the ring gear tends to rotate pinion 38 faster than pinion 39 drives it the disc 36 will rotate in the opposite direction. In other words the effect will be the same as if the drive pinion 39 were stationary and the ring gear were rotated at a slower speed. By altering the gear ratio through the counter-shaft various forward and reverse speeds are attained.

In view of the fact that the mechanism described may, with obvious modifications be adapted to numerous uses, the invention herein is not limited to the exact structure shown but will be understood to be interpreted within the scope of the appended claims.

What is claimed is—

1. In a device of the class described the combination of a driven member comprising a revoluble disc, a pinion mounted eccentrically on the disc, a drive shaft co-axial with the disc, a ring gear freely revoluble on the drive shaft, a pinion on the drive shaft meshing with the pinion on the disc, a counter-shaft having geared connection with the ring gear, means for driving the counter-shaft from the drive shaft and means for locking the counter-shaft against rotation.

2. In a variable speed drive mechanism for an agitator the combination of a drive shaft, a driven member, a pinion mounted eccentrically on the driven member, a pinion on the drive shaft meshing with the eccentrically mounted pinion, an internal ring gear mounted for rotation on the drive shaft and meshing with the eccentric pinion, a stationary internal ring gear, an agitator shaft mounted eccentrically on the driven member, a pinion on the agitator shaft meshing with a stationary ring gear and means whereby the rotatable ring gear may at times be driven at different speeds to impart rotation to the driven member for attaining proportional epicycloidal movement of the agitator shaft.

3. In combination a drive shaft, a counter-shaft, a driven member co-axial with the drive shaft, a ring gear rotatably mounted on the drive shaft, means for driving the ring gear at pre-determined speeds from the counter-shaft, a pinion on the drive shaft, an eccentrically mounted pinion on the driven member meshing with said pinion and said ring gear, a stationary ring gear, an agitator shaft journalled eccentrically on the driven member and a pinion on said agitator shaft meshing with the stationary ring gear for imparting rotation to the agitator shaft proportional to the speed of bodily movement thereof as it is carried by the driven member.

4. In combination a drive shaft, an internal gear, a driven member concentric with the drive shaft, a pinion on the driven member operatively connected with the drive shaft and internal gear and means controlling and actuating the internal gear whereby said gear may be fixed to attain high rotation of the driven member and whereby the internal gear is rotatable in one direction at various increased speeds to produce rotation of the driven member at reduced speeds, the ring gear being driven at increased rates of rotation to attain zero rotation and reverse rotation of the driven member.

5. In a device of the class described the combination of a drive shaft, a counter-shaft adapted to be driven at pre-determined different speeds from the drive shaft, means to hold the counter-shaft against rotation, a revoluble ring gear adapted for movement and fixation by the counter-shaft, a driven member having an eccentrically mounted pinion operatively connected with the drive shaft and said ring gear whereby the driven member is rotated at a speed dependent upon the difference in speeds of the drive shaft and said ring gear, an agitator shaft journalled eccentrically in the driven member, a stationary ring gear, a pinion fixed on the agitator shaft and meshing with the ring gear and means for altering the speed of rotation of the rotatable ring gear relative to the drive shaft.

6. In a device of the class described the combination of a drive shaft, a concentric driven member journalled thereon, a fixed ring gear and a floating ring gear mounted concentrically of the drive shaft, means comprising pinions on the driven member for engagement with the fixed and floating ring gears, means for establishing a constant driving connection between the drive shaft and one of said pinions and means for arresting the floating ring gear and for selective driving connection from the drive shaft whereby to impart various rates of rotation to the floating ring gears.

7. In a device of the class described the combination with a driven disc having a rotatable agitator shaft therein of a fixed ring gear operating on the agitator shaft, a floating ring gear, a drive shaft concentric with the ring gears and the driven member, pinions on the drive shaft and driven member whereby the floating ring gear may be driven from the drive shaft, a fixed member, a counter shaft having a pinion in constant mesh with the floating ring gear and means slidable longitudinally of the counter shaft to engage the fixed member for fixation of the counter shaft and floating ring gear and for imparting selected speeds to the counter shaft from the drive shaft.

In testimony whereof, I have hereunto subscribed my name this 2nd day of December, 1927.

SIGMUND SCHIFF.